United States Patent [19]

Keemer et al.

[11] Patent Number: 5,558,705
[45] Date of Patent: Sep. 24, 1996

[54] COLORED METALLIC PIGMENTS

[75] Inventors: Craig B. Keemer, Reading; Walter S. Halbach, Wyomissing; William G. Jenkins, Larksville; Russell L. Ferguson, Lehighton, all of Pa.

[73] Assignee: Silberline Manufacturing Co., Inc., Tamaqua, Pa.

[21] Appl. No.: 332,600

[22] Filed: Oct. 31, 1994

[51] Int. Cl.⁶ .............................. C09C 1/62; C09C 1/64
[52] U.S. Cl. .................. 106/403; 106/404; 106/502
[58] Field of Search ............................ 106/403, 404, 106/502

[56] References Cited

U.S. PATENT DOCUMENTS

| | | | |
|---|---|---|---|
| 4,173,492 | 11/1979 | Pollard | 106/502 |
| 4,919,922 | 4/1990 | Miyoshi et al. | 106/502 |
| 5,037,475 | 8/1991 | Chida et al. | 106/404 |

FOREIGN PATENT DOCUMENTS

| | | |
|---|---|---|
| 891269 | 3/1982 | Belgium . |
| 0477433 | 4/1992 | European Pat. Off. . |

OTHER PUBLICATIONS

Database WPI (week 8627), Derwent Publications Ltd., London, GB; AN 86–172214 & JP,A,61 103 906 (Sui Kagaku Kogyo), 22 May 1986 (see abstract).

Database WPI (week 8339), Derwent Publications Ltd., London, GB; AN 83–774209 & JP,A,58 141 248 (Toyo Aluminium), 22 Aug. 1983 (see abstract).

Chemical Abstracts, vol. 114, No. 6, 11 Feb. 1991, Columbus, Ohio, US; abstract No. 44955s, p. 101, (see abstract) & Toso To Toryo, vol. 466, 1990, pp. 50–55, XP 000121896 Takizawa, Masami.

Database WIP (week 9012), Derwent Publications Ltd., London, GB; AN 90–087772 & JP,A,02 041 370 (Shikoku Kaken Kogyo), 9 Feb. 1990 (see abstract).

*Primary Examiner*—Helene Klemanski
*Attorney, Agent, or Firm*—Merchant, Gould, Smith, Edell, Welter & Schmidt, P.A.

[57] ABSTRACT

A colored metallic pigment composition includes metallic particles which have been treated with a mixture of pigment particles and wax. A polymeric shell is formed on the treated metal particles by means of an organometallic coupling agent. The coupling agent includes a readily-hydrolyzable group which is capable of binding to the metal particle surface, and a relatively non-hydrolyzable group which serves as a binding site for the polymeric shell.

12 Claims, No Drawings

5,558,705

COLORED METALLIC PIGMENTS

FIELD OF THE INVENTION

The present invention relates generally to the field of metallic pigments. More particularly, the present invention relates to the process for preparing a colored metallic pigment suitable for use as a surface coating and to the colored metallic pigment product.

BACKGROUND OF THE INVENTION

Metallic pigments in general, and aluminum pigments in particular are widely used in the coating industry to produce finishes of the type which have a metallic luster. The procedure generally used at the present time to produce a colored finish with a metallic luster is to disperse both a metallic pigment and a transparent colored pigment in a suitable vehicle. Such dispersions have achieved wide acceptance as automotive finishes wherein a plurality of interesting colors having a metallic luster have become increasingly popular.

A previously recognized problem has been to provide a commercially acceptable procedure for economically coloring metallic pigments. Heretofore, attempts at coloring aluminum flake pigments have been tried by prior workers in the art, using a precipitation of iron oxide onto the aluminum pigment surface. Although this method produces a flake with a gold color, the procedure is rather complicated.

Another previously attempted solution was coloring metallic pigments as disclosed in U.S. Pat. No. 4,328,042 wherein the vapor deposition of iron penta-carbonyl onto an aluminum flake surface is taught. The subsequent oxidation of the iron penta-carbonyl to iron oxides and carbon dioxide then produces a colored flake. However, the color of this flake is dependent on the conditions of processing and thickness of the iron oxide layer.

In U.S. Pat. No. 4,158,074, a process for coloring aluminum powder is disclosed which includes immersing finely divided aluminum in a weak alkali solution containing a specified metallic salt and an aliphatic amine and then separating the aluminum from the solution. In U.S. Pat. No. 5,037,475 a process for coloring metallic pigments is taught that includes treating the metallic pigments with a thermally polymerized carboxylic acid having at least one double bond and at least two carboxylic acid groups, then adsorbing a colored pigment onto the treated pigment; optionally coating this product with a polymer comprised of a polymerizable unsaturated carboxylic acid and a monomer having at least three polymerizable double bonds.

SUMMARY OF THE INVENTION

It is a principal object of the present invention to provide colored metallic pigments, particularly aluminum pigments, wherein a surface coating can be produced having the desired metallic luster without requiring the additional dispersion of a transparent colored pigment.

Another object of the present invention is to provide a process to reproducibly and irreversibly color specific grades of aluminum flake pigments.

Other objects, advantages and features of the present invention will be more readily appreciated and understood when considered in conjunction with the following detailed description and drawings.

DESCRIPTION OF THE PREFERRED EMBODIMENTS

The invention and various advantageous details thereof are explained more fully below.

This invention relates to colored metallic pigments suitable for use in surface coatings and more particularly teaches how to make metallic particles having a color imparted thereto, and wherein the desired metallic luster has been retained.

The present invention provides for coloring metallic particles, such as aluminum flakes, with a dispersion of colored pigment particles and one or more waxes in an organic solvent. The metallic particles and the pigment dispersion are blended together, enough solvent is removed to yield a pasty texture and the paste is agitated to physically adsorb the wax/pigment mixture onto the surface of the metallic particles.

The resultant product is dispersed in an organic solvent, or a mixture of organic solvent and water, and an organometallic coupling agent, containing at least one readily hydrolyzable group and at least one relatively non-hydrolyzable organic group, is added. This coupling agent bonds to the surface of the treated metallic particle through the reaction of hydroxyl groups on the particle surface with the readily hydrolyzable organic group. The non-hydrolyzable organic group remains and serves as a site to bind the treated metallic particle to a polymeric shell. The polymeric shell is formed by adding one or more monomers containing polymerizable double bonds, at least one of which contains at least three polymerizable double bonds, and a polymerization initiator, and heating the dispersion to begin the reaction.

When the reaction is complete, excess organic solvent is removed to form a colored metallic pigment paste. This paste displays a strong color intensity while retaining the metallic luster of the untreated metallic particles. It also possesses excellent color retention when dispersed in organic solvents commonly used in the coatings industry.

The first step in this process is to make a dispersion of a colored pigment and one or more waxes in an organic solvent. The coloring pigment which can be used in the present invention may be any organic or inorganic pigments that do not dissolve in the organic solvents to be used.

Specific examples of the organic pigment which can be used in the present invention include azo lake pigments such as Brilliant Carmine 6B, Lake Red C, Permanent Red 2B and Bordeau 10B; insoluble azo pigments such as Brilliant Fast Scarlet, Fast Yellow ER, Naphthol Red HFG, Fast Yellow FGL, Disazo Yellow HR and Pyrazolone Orange; condensed azo pigments such as Chromophthal Yellow GR, Chromophthal Orange 4R, Chromophthal Red 144, Chromophthal Scarlet RN, and Chromophthal Brown 5R; phthalocyanine pigments such as Phthalocyanine Blue and Phthalocyanine Green; threne pigments such as Anthrapyridine Yellow, Flavanthrone Yellow, Acylamide Yellow, Pyranthrone Orange, Anthoanthrone Orange, Dianthraquinyl Red, Isoviolandrone Blue and Indanthrone Blue; indigo pigments such as Indigo Blue, Thioindigo Bordeau and Thioindigo Magenta; perinone pigments such as Perinone Orange and Perinone Red; perylene pigments such as Perylene Red, Perylene Scarlet, Perylene Marine and Perylene Brown; phthalone pigments such as Quinophthalone; dioxazine pigments such as Dioxazine Violet; quinacridone pigments such as Quinacridone Gold, Quinacridone Red, Quinacridone Magenta, Quinacridone Scarlet, and Quinacridone Marine; isoindolinone pigments such as Isoindolinone Yellow, Isoindolinone Red and Isoindolinone Orange; metal complex pigments such as Nickel Dioxine Yellow, Copper Azomethine Yellow, and Nickel Azo Yellow; pyrrolo-pyrrol pigments such as Irgazin DPP Red BO, and the like.

Examples of the inorganic pigments which can be used in the present invention include chrome yellow, yellow iron oxide, red iron oxide, black iron oxide, cobalt blue, carbon black and titanium oxide.

"Wax" is defined in Hawley's Condensed Chemical Dictionary, Twelfth Edition, as "a low-melting organic mixture or compound of high molecular weight, solid at room temperature, and generally similar in composition to fats and oils except that it contains no glycerides."

They may be natural or synthetic. Some are hydrocarbons, such as polyethylene or polypropylene, while others are acids, esters, amides, ethers, or halogenated versions of any of these. Different types of waxes may be used alone or in combination.

Particularly good results are obtained when using several waxes supplied by Hoechst Celanese, such as Wax PE-130 or PE-520 (polyethylene), Wax PP-230 (polypropylene), Wax R-21 (hydrocarbon), Wax V (polyvinyl ether), Wax C (polyamide), and the like. Especially preferred is a 4:1 blend of Wax R-21/Wax C.

Examples of the organic solvent which can be used in the present invention include aliphatic hydrocarbons such as hexane, heptane, octane and mineral spirits; aromatic hydrocarbons such as benzene, toluene, solvent naphtha and xylene; esters such as ethyl acetate and butyl acetate; ethers such as tetrahydrofuran and di-ethyl ether; and the like. Mineral spirits is generally preferred, as it is widely used in the metallic pigment industry and has low toxicity and low cost.

To make the dispersion, the wax or waxes to be used should first be dissolved in the organic solvent. This may require heat to achieve complete solvation. The colored pigment is then added and the mixture is introduced into a high shear device in order to reduce the pigment particles to their primary size, in order to maximize the color intensity produced. Any size reduction equipment generally used in the coatings industry may be employed. Very good results are obtained with media mills, either horizontal or vertical.

The amount of pigment in the dispersion should be as high as possible in order to minimize the amount of solvent used. This maximum amount will depend on the oil absorption of the pigment, the organic solvent used, the type and amount of wax used, and the size reduction equipment used. Up to about 60% pigment by weight may be used, but optimum results are usually achieved in the range of 10% to 30% pigment by weight.

The amount of wax in the dispersion depends on the wax or waxes used, and must be determined experimentally for each colored pigment and metallic particle. Too little wax does not provide the desired physical adsorption onto the metallic particles, while too much wax does not yield any further improvement in adsorption, and can have adverse effects on the rheological or physical properties of paint systems incorporating these pigments. Generally, 1% to 50% wax, based on the weight of pigment, is sufficient, with 5% to 15% preferred.

Optionally, dispersants, surfactants, or other surface active materials may be added to improve the pigment grind or the stability of the dispersion. Care should be exercised in choosing these materials, as many of them have detrimental effects on the properties of paints incorporating these pigments.

This dispersion is then used to treat the metallic particles. These particles may be composed of aluminum, zinc, iron, nickel, tin, copper, silver, or other pure elements, or of brass, bronze, or other alloys. In practice, aluminum, which has a wide application as a silver color pigment, is generally used.

The particles may be in the form of flakes or spheres, so long as the surface is reflective enough to provide the desired metallic luster. They may be a dry powder or in a paste containing an organic solvent or water. The exact form, shape, and particle size distribution of the particles depends on the effect desired.

The pigment dispersion and the metallic particles are added to a mixer. The amount of dispersion added should be enough to provide the colored pigment at 1% to 300%, preferably 10% to 100%, based on the weight of the metallic particles. Using less colored pigment does not provide enough color intensity, while using more decreases the metallic luster. Because the solids content of the dispersion is usually low, this yields a wet "soupy" mixture. In order to facilitate the adsorption of the wax/pigment dispersion onto the particle, solvent must be removed to give a more paste-like consistency. The most convenient method is to agitate the mixture under vacuum, while applying heat until the desired consistency is reached. This consistency usually occurs at a solids content of 45% or higher, preferably 55% or higher.

Once the desired consistency is achieved, the mixture is slowly agitated for a period of time between 30 minutes and 12 hours, in order to effect the adsorption. This adsorption is physical, not chemical, as the wax/pigment dispersion can be readily removed from the metallic surface, at this point, by washing with many organic solvents. The adsorption does not completely cover the metallic surface, and the uncovered areas are available to participate in subsequent reactions.

The metallic particles with the adsorbed wax and pigment are then dispersed in an organic solvent. Any of the organic solvents mentioned above may be used, but mineral spirits is preferred for the previously stated reasons, and because it produces a minimal amount of desorption of the wax and pigment.

An organometallic coupling agent such as a silane, titanate, or zirconate, is then added under agitation. These materials contain hydrolyzable groups which can react with hydroxyl groups on the uncovered areas of the metallic particles, and thereby chemically bond to the metal surface.

Silane coupling agents have the general structure:

$$R_n SiX_{(4-n)} \qquad (I)$$

X is the hydrolyzable group, typically alkoxy, acryloxy, amine, or chlorine. The most common groups are methoxy and ethoxy, which give methanol and ethanol, respectively, during coupling reactions.

R is a non-hydrolyzable organic group, which usually possesses a functionality which enables the coupling agent to bond with organic resins and polymers. This functionality may be amino, styryl, epoxy, chloroalkyl, chloroaryl, mercapto, alkanolamine, vinyl, silazane, phosphine, methacrylate, isocyanate, phosphate, thiouronium, quaternary, ureido, peroxy, acrylate, allyl, or the like.

A particularly useful silane for the current invention is 3-glycidoxypropyltrimethoxy silane, sold by Dow Corning as Z- 6040.

Titanate and zirconate coupling agents have the general structures:

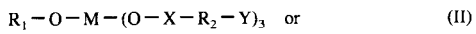

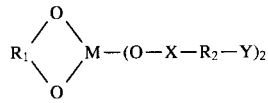

M is either a titanium or zirconium atom.

$R_1$ is the hydrolyzable group. Unlike silanes, this group is always organic, and can be a longer chain species such as isopropyl or neopentyl.

$(O-X-R_2-Y)$ is the non-hydrolyzable group. X, $R_2$, and Y may be present individually or in any combination. X is the binder functional group, such as alkylate, carboxyl, sulfonyl, phenolic, phosphate, pyrophosphate, or phosphite groups. $R_2$ is the thermoplastic functional group, generally a long-chain hydrocarbon. Y is the thermoset functional group, such as methacrylate, amine, hydroxy, epoxy, mercapto, or the like.

The amount of coupling agent used depends on the coupling agent and on the surface area of the metallic particles. Generally, 0.05% to 10%, based on the weight of the metal/wax/pigment substrate, is sufficient, while 0.1% to 5% is preferred.

The slurry is agitated for a period of time ranging from several minutes to five hours, to allow the coupling agent to react with the substrate. The temperature of the slurry during this period may be anywhere from room temperature up to the reaction temperature for the subsequent polymerization.

One or more monomers are then added under agitation. Each monomer must contain at least one polymerizable double bond, and at least one monomer must contain at least three polymerizable double bonds. The total amount of monomer added depends on the surface area of the metal/wax/pigment substrate. Generally, the amount of monomer is 1% to 50%, preferably 2% to 20%, of the weight of the substrate.

Suitable monomers having at least three polymerizable double bonds in the molecule for use in the invention include, for example, trimethylolpropane triacrylate, trimethylolpropane trimethacrylate, tetramethylolmethane triacrylate, and tetramethylolmethane tetracrylate, and the like.

Suitable monomers having one or two polymerizable double bonds in the molecule for use in the invention include: ethylene glycol dimethacrylate, diethylene glycol dimethacrylate, triethylene glycol dimethacrylate, 1,3-butylene glycol dimethacrylate, neopentyl glycol diacrylate, styrene, $\alpha$-methylstyrene, vinyltoluene, acrylonitrile, methacrylonitrile, vinyl acetate, vinylpropionate, acrylic acid, methacrylic acid, crotonic acid, itaconic acid, citraconic acid, oleic acid, maleic acid, maleic anhydride, divinylbenzene, methyl acrylate, ethyl acrylate, n-butyl acrylate, 2-ethylhexyl acrylate, lauric acrylate, stearyl acrylate, hydroxyethyl acrylate, hydroxypropyl, acrylate, methoxyethyl acrylate, butoxyethyl acrylate, cyclohexyl acrylate, 1,6-hexanedioldiacrylate, 1,4-butanedioldiacrylate, methyl methacrylate, ethyl methacrylate, n-butyl methacrylate, 2-ethylhexyl methacrylate, lauric methacrylate, stearyl methacrylate, hydroxyethyl methacrylate, hydroxypropyl methacrylate, methoxyethyl methacrylate, butoxyethyl methacrylate, cyclohexyl methacrylate, 2-methacryloxyethyl phosphate, di-2-methacryloxyethyl phosphate, tri-2-methacryloxyethyl phosphate, 2-acryloxyethyl phosphate, di-2-acryloxyethyl phosphate, tri-2-acryloxyethyl phosphate, diphenyl-2-methacryloxyethyl phosphate, diphenyl-2-acryloxyethyl phosphate, dibutyl-2-methacryloxyethyl phosphate, dibutyl-2-acryloxyethyl phosphate, dioctyl-2-methacryloxyethyl phosphate, dioctyl-2-acryloxyethyl phosphate, 2-methacryloxypropyl phosphate, bis(2-chloroethyl) vinyl phosphonate, diallyldibutyl phosphonosuccinate, and the like.

The slurry is then heated to the desired reaction temperature, and the polymerization initiator is added.

As a polymerization initiator, organic peroxides such as di-t-butyl peroxide, acetyl peroxide, benzoyl peroxide, lauroyl peroxide, cumyl hydroperoxide, isobutyl peroxide, methyl ethyl ketone peroxide, and t-butyl hydroperoxide; and azo compounds such as $\alpha,\alpha'$-azo-bisisobutyronitrile may be used. But, the last-mentioned is the most preferable because it dissociates at relatively low temperatures.

The reaction temperature for polymerization should be 60°–200° C. If $\alpha,\alpha'$-azo-bisisobutyronitrile is used, it should be 70°–90° C. For lower or higher temperatures beyond that range, the reaction speed or the polymerization efficiency would decrease.

The polymerization initiator is used in an amount of 0.1 to 50 parts, preferably 1 to 20 parts, by weight per 100 parts by weight of the monomer. Lesser amounts of the initiator are impractical since prolonged time is required for the polymerization. Exceeding 50 parts by weight is also impractical because the polymerization proceeds so rapidly that it cannot be controlled.

The reaction is allowed to proceed for a period of time ranging from 30 minutes to 12 hours, preferably 1 to 8 hours. Excess solvent is then removed by any convenient method, such as evaporation, filtration, or centrifugation, to yield a paste with a solids content of 30% to 90% by weight, preferably 40% to 70%. Additional solvent may be added to reach the desired final solvent content.

The colored metallic particles of the invention show good color retention when dispersed in solvents commonly used in the coatings industry, such as aliphatics, aromatics, alcohols, ketones, esters, glycol ethers, glycol ether acetates, water, and the like. When formulated into a coating system and applied to a surface, they exhibit strong color intensity and metallic luster.

The foregoing descriptions of preferred embodiments are provided by way of illustration. Practice of the present invention is not limited thereto and variations therefrom will be readily apparent to the skilled without deviating from the spirit of the present invention.

EXAMPLES

Specific embodiments of the invention will now be further described by the following, non-limiting examples which will serve to illustrate various features of significance. The examples are intended merely to facilitate an understanding of ways in which the invention may be practiced and to further enable those of skill in the art to practice the invention. Accordingly, the examples should not be construed as limiting the scope of the invention.

Example 1

A dispersion of Phthalocyanine Blue pigment in mineral spirits containing a 4:1 ratio of Wax R-21 to Wax C is prepared. The Phthalocyanine Blue is used at 17% by weight of the dispersion and the waxes are present at a combined amount of 15.3% by weight of the blue pigment. This slurry is passed through a horizontal media mill until the pigment is ground to its primary particle size, such that a Hegman Grind Gage reading of 7.5 or better is obtained.

This dispersion is then added to a mixer containing SSP-554 ALUMINUM PASTE, from Silberline Manufacturing Co., Inc. Enough of the dispersion is added to provide the blue pigment at a level of 50% by weight of the aluminum flakes. The mixture is agitated for one hour in order to homogenize it. It is then heated to 80° C. and a vacuum is applied to pull off excess mineral spirits. This drying process continues until the mixture has reached a solids content of 60% or greater. It is then agitated for an additional 1–2 hours, in order to cause adsorption of the pigment/wax dispersion onto the surface of the aluminum flakes.

A portion of this mixture is then slurried in mineral spirits at a solids content of 15% by weight. Z-6040 silane coupling agent is then added at 0.21% by weight of solids, and the slurry is agitated for 15–30 minutes. Trimethylolpropane trimethacrylate monomer is then added under agitation at an amount of 10% by weight of solids and the temperature is raised to 80° C. When this temperature is reached, α,α'-azobisisobutyronitrile is added in an amount of 10% by weight of monomer and the reaction is allowed to proceed for 5 hours. It is then cooled to room temperature and excess mineral spirits is removed by filtration, yielding a paste of blue-colored aluminum pigment with a solids content of 45% or higher.

When the pigments of these examples are incorporated into a coating system and applied to a substrate, an intense color is obtained from the colored pigment, while maintaining the metallic luster provided by the aluminum flakes. When these paints are lightly sprayed over a different color coating, distinct colored aluminum particles are seen, with no discoloration of the hue of the underlying coating. This is an effect that cannot be achieved by separately adding colored pigments and aluminum flakes to a coating vehicle.

While there is shown and described herein certain specific combinations embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to

TABLE 1

| EXAMPLE NO. | DISPERSION | | | TREATMENT OF METALLIC PARTICLES | | | | |
|---|---|---|---|---|---|---|---|---|
| | PIGMENT | WT. % | WAX(ES) | % OF PIGMENT | % PIGMENT ON METAL | COUPLING AGENT | % ON SUBSTRATE | MONOMER | % ON SUBSTRATE |
| 1 | Phathalocyanine Blue | 17.0 | R21/C | 12.4%/2.9% | 50 | Z6040 | 0.21 | Trimethylolpropane trimethacrylate | 10.0 |
| 2 | Phathalocyanine Blue | 17.0 | R21/C | 8%/2% | 50 | Z6040 | 0.21 | Trimethylolpropane trimethacrylate | 10.0 |
| 3 | Phathalocyanine Blue | 31.8 | R21/C/ PE520 | 8%/2%/5% | 20 | Z6040 | 0.50 | Trimethylolpropane trimethacrylate | 10.0 |
| 4 | Phathalocyanine Green | 19.6 | R21/C | 8%/2% | 20 | Z6040 | 0.50 | Trimethylolpropane trimethacrylate | 10.0 |
| 5 | Phathalocyanine Green | 26.6 | R21/C | 8%/2% | 30 | Z6040 | 0.50 | Trimethylolpropane triacrylate | 10.0 |
| 6 | Phathalocyanine Green | 26.6 | R21/C | 8%/2% | 50 | Z6040 | 0.21 | Trimethylolpropane trimethacrylate | 10.0 |
| 7 | Phathalocyanine Green | 33.0 | R21/C | 8%/2% | 30 | Z6040 | 0.50 | Trimethylolpropane trimethacrylate | 5.0 |
| 8 | Phathalocyanine Green | 33.0 | R21/C | 4%/1% | 30 | Z6040 | 0.50 | Trimethylolpropane trimethacrylate | 10.0 |
| 9 | Pyrrolo-pyrrole | 18.0 | R21/C | 4.4%/1.1% | 50 | Z6040 | 0.21 | Trimethylolpropane trimethacrylate | 10.0 |
| 10 | Quinacridone Gold G/S | 15.0 | R21/C | 14%/3.3% | 50 | Z6040 | 0.21 | Trimethylolpropane trimethacrylate | 10.0 |
| 11 | Quinacridone Gold G/S | 15.0 | R21/C | 8%/2% | 50 | Z6040 | 0.21 | Trimethylolpropane trimethacrylate | 10.0 |
| 12 | Quinacridone Gold G/S | 12.0 | R21/C | 17.5%/4.2% | 50 | Z6040 | 0.21 | Trimethylolpropane trimethacrylate | 10.0 |
| 13 | Quinacridone Gold G/S | 12.0 | R21/C | 8%/2% | 50 | Z6040 | 0.21 | Trimethylolpropane trimethacrylate | 10.0 |
| 14 | Quinacridone Magenta | 32.3 | R21/C | 8%/2% | 50 | Z6040 | 0.21 | Trimethylolpropane trimethacrylate | 10.0 |
| 15 | Quinacridone Violet | 32.3 | R21/C | 8%/2% | 50 | Z6040 | 0.21 | Trimethylolpropane trimethacrylate | 10.0 |
| 16 | Titanium dioxide | 31.8 | R21/C/ PE520 | 8%/2%/5% | 20 | Z6040 | 0.50 | Trimethylolpropane trimethacrylate | 10.0 |

Examples 2–16

The procedure of Example 1 is repeated, with changes in the type of pigment, waxes, or monomer, or in the amount of pigment, waxes, coupling agent, or monomer, as detailed in Table 1.

the particular forms herein shown and described except insofar as indicated in the scope of the appended claims.

The entirety of everything cited above or below is expressly incorporated herein by reference.

What is claimed is:

1. A colored metallic pigment composition, comprising:

a metallic particle;

a pigment dispersion comprising colored pigment particles dispersed in a wax, adsorbed on part of the surface of the metallic particle;

an organometallic coupling agent bound to the surface of the metallic particle through a readily hydrolyzable group; and a polymeric shell, the coupling agent having a relatively non-hydrolyzable group which serves as a binding site for the polymeric shell.

2. The composition of claim 1, wherein the metallic particle is composed of aluminum, zinc, iron, nickel, tin, copper, silver, brass or bronze.

3. The composition of claim 1, wherein the pigment is selected from the group consisting of azo lake pigments, insoluble azo pigments, condensed azo pigments, phthalocyanine pigments, threne pigments, indigo pigments, perinone pigments, perylene pigments, phthalone pigments, dioxazine pigments, quinacridone pigments, isoindolinone pigments, metal complex pigments, pyrrolo-pyrrol pigments and inorganic pigments.

4. The composition of claim 1, wherein the coupling agent is selected from the group consisting of silanes, titanates and zirconates.

5. A method of making colored metallic particles comprising dispersing colored pigment particles and a wax to form a pigment dispersion;

mixing metallic particles and the pigment dispersion together to adsorb the mixture onto part of the surfaces of the metallic particles to form treated metallic particles;

adding an organometallic coupling agent, said organometallic coupling agent comprising at least one readily hydrolyzable group and at least one relatively non-hydrolyzable organic group so that the coupling agent bonds to the surface of the treated metallic particles through reaction at the particle surface with the readily hydrolyzable organic group and the non-hydrolyzable organic group remains and serves as a site to bind the treated metallic particle to a polymeric shell;

adding one or more monomers containing polymerizable double bonds, at least one of which contains at least three polymerizable double bonds, and a polymerization initiator; and polymerizing the monomer or monomers to provide the treated metallic particles with polymeric shells.

6. The method of claim 5, wherein the pigment particles and wax are dispersed in a first organic solvent, and after the metallic particles are mixed with the dispersion, some of the first organic solvent is removed to form a paste.

7. The method of claim 6, wherein the paste is subjected to agitation to physically adsorb the wax and pigment mixture onto the metallic particles to form the treated metallic particles.

8. The method of claim 6, wherein the treated metallic particles are dispersed in a second organic solvent prior to addition of the coupling agent.

9. The method of claim 8, wherein a polymerization initiator is added with the monomer, and the mixture is heated to begin the polymerization reaction.

10. The method of claim 5, wherein the metallic particle is composed of aluminum, zinc, iron, nickel, tin, copper, silver, brass or bronze.

11. The method of claim 5, wherein the pigment is selected from the group consisting of azo lake pigments, insoluble azo pigments, condensed azo pigments, phthalocyanine pigments, threne pigments, indigo pigments, perinone pigments, perylene pigments, phthalone pigments, dioxazine pigments, quinacridone pigments, isoindolinone pigments, metal complex pigments, pyrrolo-pyrrol pigments and inorganic pigments.

12. The method of claim 5, wherein the coupling agent is selected from the group consisting of silanes, titanates and zirconates.

\* \* \* \* \*